United States Patent [19]
Bates et al.

[11] Patent Number: 5,777,616
[45] Date of Patent: Jul. 7, 1998

[54] DATA PROCESSING SYSTEM AND METHOD FOR INVOKING A FUNCTION OF A MULTIFUNCTION ICON IN A GRAPHICAL USER INTERFACE

[75] Inventors: Cary L. Bates; Paul R. Day, both of Rochester, Minn.

[73] Assignee: International Business Machines Corporation, Armonk, N.Y.

[21] Appl. No.: 689,187

[22] Filed: Aug. 5, 1996

[51] Int. Cl.$^6$ .................................................. G06F 3/00
[52] U.S. Cl. .................................................. 345/339
[58] Field of Search .................................. 345/339, 346, 345/349, 333, 334, 348, 358, 977

[56] References Cited

U.S. PATENT DOCUMENTS

| | | | |
|---|---|---|---|
| 5,146,556 | 9/1992 | Hullot et al. | 345/348 |
| 5,287,448 | 2/1994 | Nicol et al. | 345/337 |
| 5,297,249 | 3/1994 | Bernstein et al. | 345/356 |
| 5,408,659 | 4/1995 | Cavendish et al. | 395/701 |
| 5,428,734 | 6/1995 | Haynes et al. | 345/349 |
| 5,434,965 | 7/1995 | Matheny et al. | 345/338 |
| 5,436,637 | 7/1995 | Gayraud et al. | 345/116 |
| 5,437,014 | 7/1995 | Busboom et al. | 345/329 |
| 5,442,742 | 8/1995 | Greyson et al. | 707/539 |
| 5,461,710 | 10/1995 | Bloomfield et al. | 345/349 |
| 5,488,685 | 1/1996 | Palmer et al. | 345/338 |
| 5,565,888 | 10/1996 | Selker | 345/146 |
| 5,634,095 | 5/1997 | Wang et al. | 345/326 |
| 5,668,571 | 9/1997 | Pai et al. | 345/348 |

OTHER PUBLICATIONS

"Drop Site Catalog for Leading the User through the Drag and Drop Process", IBM Technical Disclosure Bulletin, vol. 38, No. 08, Aug. 1995.

G. Fitzpatrick and T. Haynes, "Double–Click Direct Manipulation to Overide Defaults", IBM Technical Disclosure Bulletin, vol. 35, No. 7, Dec. 1992.

K.D. Johnson, A.R. Mills and S.A. Morgan, Providing Visual and Audible Extensions to Enhanced Drag/Drop Paradigm, IBM Technical Disclosure Bulletin, vol. 38, No. 2, Feb. 1995.

*Primary Examiner*—A. Katbab
*Attorney, Agent, or Firm*—Andrew J. Dillon

[57] ABSTRACT

A data processing system and method of invoking a function within a data processing system are disclosed. The data processing system includes a processing unit, a display device that displays graphical objects in response to receipt of signals from the processing unit, a memory coupled to the processing unit, and a graphical user interface (GUI) manager stored within the memory and executable by the processing unit. In accordance with the method of the present invention, first and second graphical objects are displayed within the display device. The second graphical object includes a plurality of regions that each have an associated function. In response to a selection of the first graphical object, a determination is made whether the first graphical object is within a selected proximity of the second graphical object. If so, a particular region among the plurality of regions of the second graphical object, which would be selected in the event of a deselection of the first graphical object, is graphically indicated. In response to a deselection of the first graphical object while the first graphical object is within the selected proximity of the second graphical object, the function associated with the particular region is performed. In one embodiment of the present invention, the graphical indication of the particular region of the second graphical object comprises a drag pointer that extends between the first graphical object and the particular region. In this embodiment, a textual indication of the action associated with the particular region is also displayed.

21 Claims, 9 Drawing Sheets

DATA PROCESSING SYSTEM AND METHOD FOR INVOKING A FUNCTION OF A MULTIFUNCTION ICON IN A GRAPHICAL USER INTERFACE

BACKGROUND OF THE INVENTION

1. Technical Field:

The present invention relates in general to a method and system for data processing and in particular to a data processing system and method for invoking a function within a graphical user interface. Still more particularly, the present invention relates to a data processing system and method for invoking one of the functions of a multifunction icon utilizing a drag-and-drop technique.

2. Description of the Related Art:

The development and proliferation of graphical user interfaces (GUIs) has greatly enhanced the ease with which users interact with data processing systems. A conventional GUI display includes a desktop metaphor upon which one or more icons, application windows, or other graphical objects are displayed. Typically, a data processing system user interacts with a GUI display utilizing a graphical pointer, which the user controls with a graphical pointing device, such as a mouse, trackball, or joystick. For example, depending upon the actions allowed by the active application or operating system software, the user can select icons or other graphical objects within the GUI display by positioning the graphical pointer over the graphical object and depressing a button associated with the graphical pointing device. In addition, the user can typically relocate icons, application windows, and other graphical objects on the desktop utilizing the well known drag-and-drop technique. By manipulating the graphical objects within the GUI display, the user can control the underlying hardware devices and software objects represented by the graphical objects in a graphical and intuitive manner.

Conventional GUIs often include an icon that supports one or more functions that a user can invoke by dropping onto the icon a dragged icon representing a hardware device or software object that the user desires to manipulate. For example, a GUI may permit a user to move a data file into a directory by dragging and dropping a document icon representing the data file onto a folder icon representing the directory. Although this manner of interaction facilitates the invocation of a function in cases in which the base icon supports only a single function, invocation of functions is often less graphical and intuitive for multifunction icons. For example, in response to a dragged icon being dropped onto a multifunction icon, some GUIs display an additional pop-up menu from which the user must select a function to be performed. Alternatively, other GUIs assign different functions to each button of the graphical pointing device in order to permit the user to invoke a function supported by the multifunction icon. In either case, the user is not provided with an indication of the functions supported by the multifunction icon prior to dropping the icon to be acted upon—a behavior that diminishes the graphical and intuitive appeal of conventional GUIs.

As should thus be apparent, an improved GUI is needed that indicates to a user in a graphical and intuitive manner which of the functions supported by a multifunction icon will be invoked in response to a dragged icon being dropped onto the multifunction icon.

SUMMARY OF THE INVENTION

It is therefore one object of the present invention to provide an improved method and system for data processing.

It is another object of the present invention to provide an improved data processing system and method for invoking a function within a graphical user interface.

It is yet another object of the present invention to provide a data processing system and method for invoking one of the functions of a multifunction icon utilizing a drag-and-drop technique.

The foregoing objects are achieved as is now described. A data processing system and method of invoking a function within a data processing system are disclosed. The data processing system includes a processing unit, a display device that displays graphical objects in response to receipt of signals from the processing unit, a memory coupled to the processing unit, and a graphical user interface (GUI) manager stored within the memory and executable by the processing unit. In accordance with the method of the present invention, first and second graphical objects are displayed within the display device. The second graphical object includes a plurality of regions that each have an associated function. In response to a selection of the first graphical object, a determination is made whether the first graphical object is within a selected proximity of the second graphical object. If so, a particular region among the plurality of regions of the second graphical object, which would be selected in the event of a deselection of the first graphical object, is graphically indicated. In response to a deselection of the first graphical object while the first graphical object is within the selected proximity of the second graphical object, the function associated with the particular region is performed. In one embodiment of the present invention, the graphical indication of the particular region of the second graphical object comprises a drag pointer that extends between the first graphical object and the particular region. In this embodiment, a textual indication of the action associated with the particular region is also displayed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
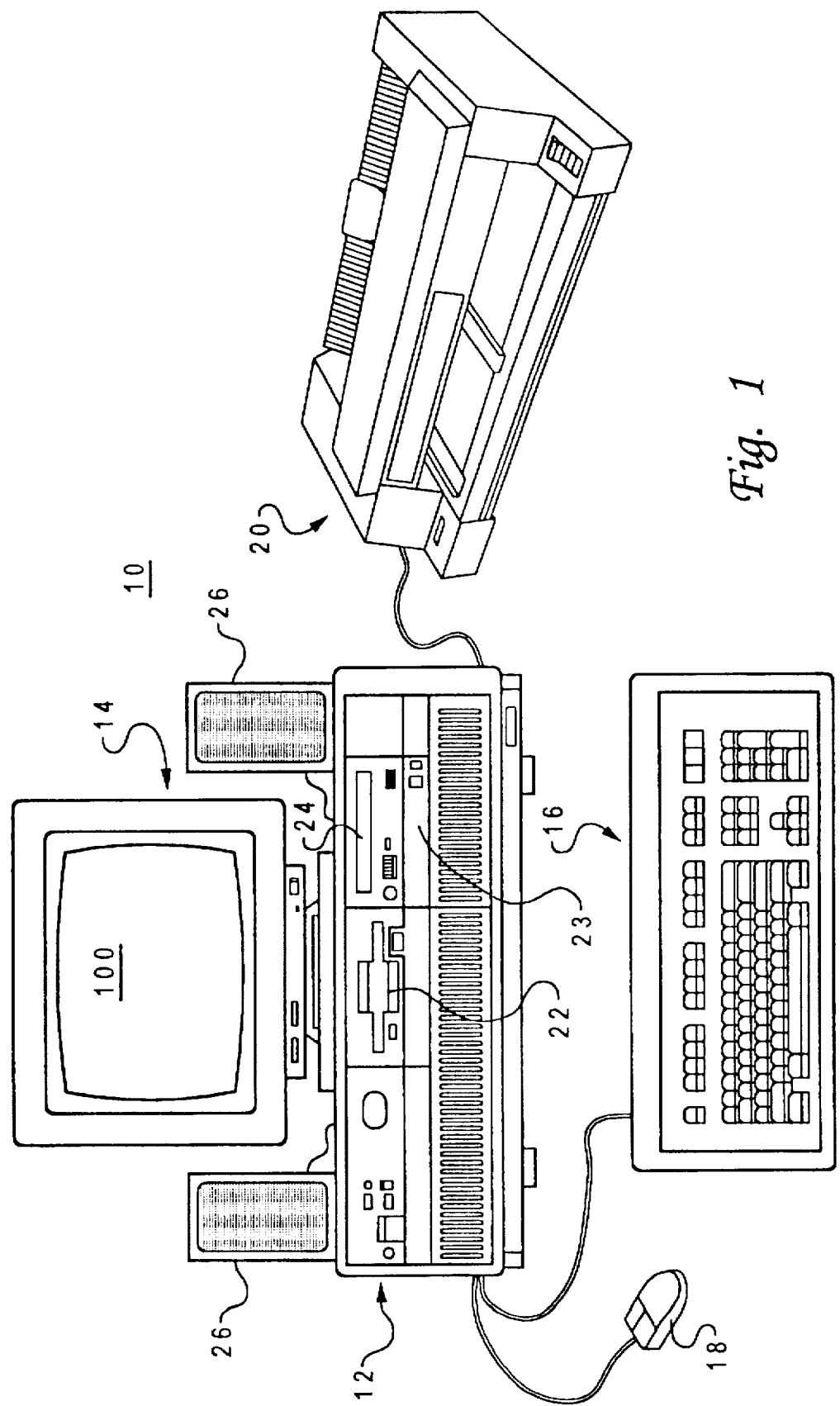
FIG. 1 illustrates an illustrative embodiment of a data processing system that can be utilized to implement the present invention.

With reference now to the figures and in particular with reference to FIG. 1, there is depicted an illustrative embodiment of a data processing system that may be utilized to implement the present invention. As illustrated, data processing system 10 includes processing unit 12, display device 14, keyboard 16, mouse 18, printer 20, and speakers 26. As is well-known in the computer arts, processing unit 12 receives input data from input devices such as keyboard 16, mouse 18, and local area networking interfaces (not illustrated) and presents output data to a user via display device 14, printer 20, and speakers 26. As described in detail below, mouse 18 is preferably utilized in conjunction with a graphical user interface (GUI) in which hardware components and software objects are controlled through the selection and manipulation of associated graphical objects displayed within display device 14. Although data processing system 10 is illustrated with mouse 18, those skilled in the art will recognize that other graphical pointing devices, such as a graphics tablet, joystick, trackball, trackpad, or the IBM TrackPoint™, can also be utilized. To support storage and retrieval of data, processing unit 12 further includes diskette drive 22, hard disk drive 23, and CD-ROM drive 24, which are interconnected with other components of processing unit 12 in a well-known manner. Of course, those skilled in the art are aware that additional conventional components can also be connected to processing unit 12.

Figure 2:
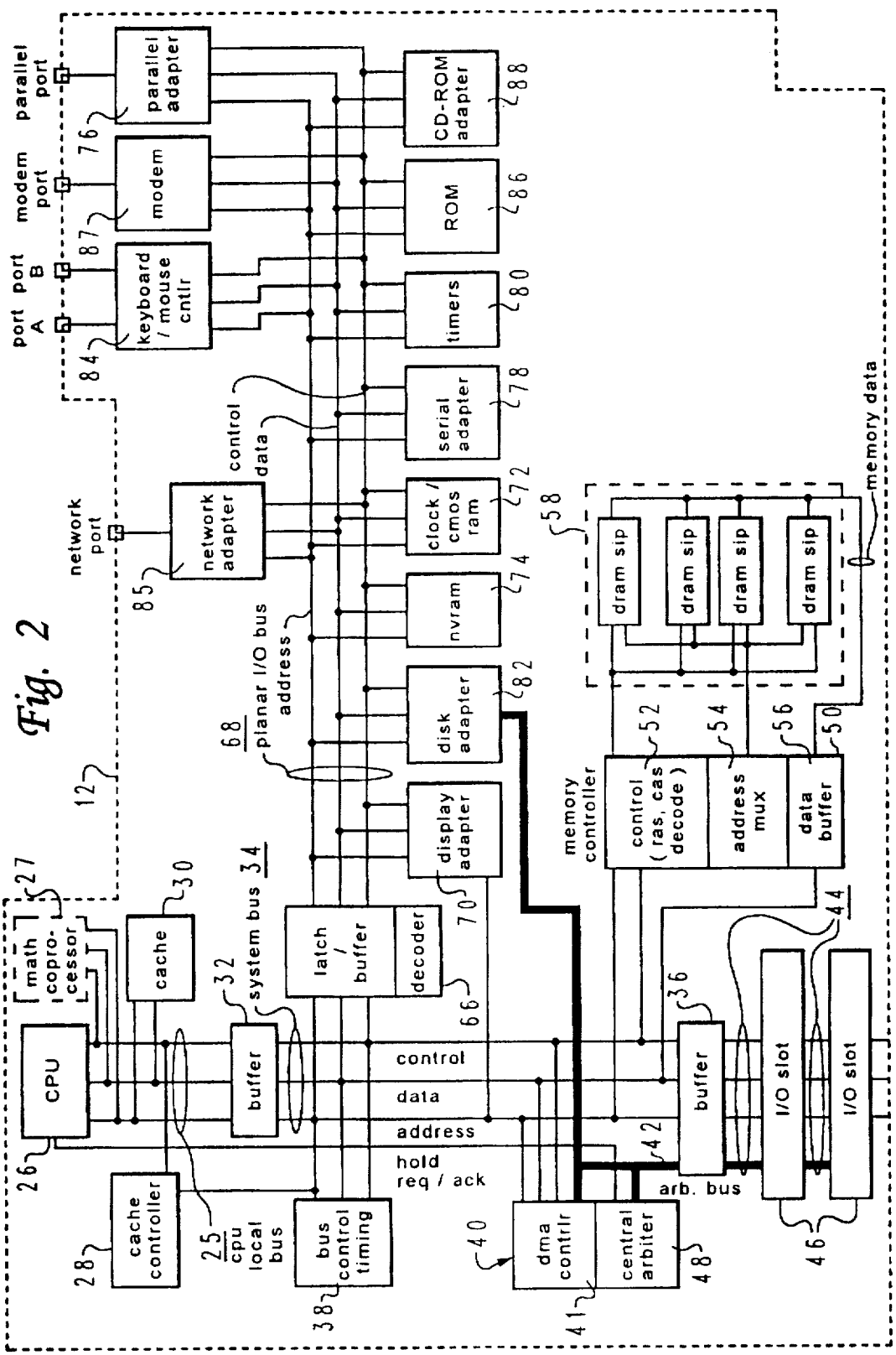
FIG. 2 depicts a more detailed block diagram representation of the processing unit of the data processing system illustrated in FIG. 1.

Referring now to FIG. 2, there is depicted a block diagram of the principal components of processing unit 12 of data processing system 10. As illustrated, processing unit 12 includes a central processing unit (CPU) 26 which executes software instructions. While any appropriate processor can be utilized for CPU 26, CPU 26 is preferably one of the PowerPC™ line of microprocessors available from IBM Microelectronics. Alternatively, CPU 26 can be implemented as one of the 80x86 or Pentium processors, which are available from a number of vendors.

In addition to CPU 26, an optional math coprocessor 27, cache controller 28, and cache memory 30 are coupled to high-speed CPU local bus 25. Math coprocessor 27 is an optional processor, distinct from CPU 26, that performs numeric calculations with greater efficiency than CPU 26. Math coprocessor 27 is optional since the performance advantage provided by a math coprocessor may be achieved by enhancements to CPU 26, such as the implementation of multiple fixed-point or floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 52, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 46 for receiving adapter cards which may be further connected to additional memory or I/O devices, such as speakers 26. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS), which provides user-transparent I/O when CPU 26 is operating under a selected operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within processing unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces processing unit 12 with keyboard 16 and a graphical pointing device, such as mouse 18.

Finally, processing unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as the information service provided by Prodigy Services Corporation under the service mark "PRODIGY." Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As will be described in detail below, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer via a variety of signal-bearing media, which include, but are not limited to: (a) information permanently stored on non-writable storage media (e.g., read only memory devices within a computer such as ROM 86 or CD-ROM disks readable by CD-ROM drive 24); (b) information alterably stored on writable storage media (e.g., floppy disks within diskette drive 22 or hard disk drive 23); or (c) information conveyed to a computer through communication media, such as through a computer or telephone network. It should be understood, therefore, that such signal-bearing media, when carrying computer readable instructions that direct the method functions of the present invention, represent alternative embodiments of the present invention.

Figure 3:
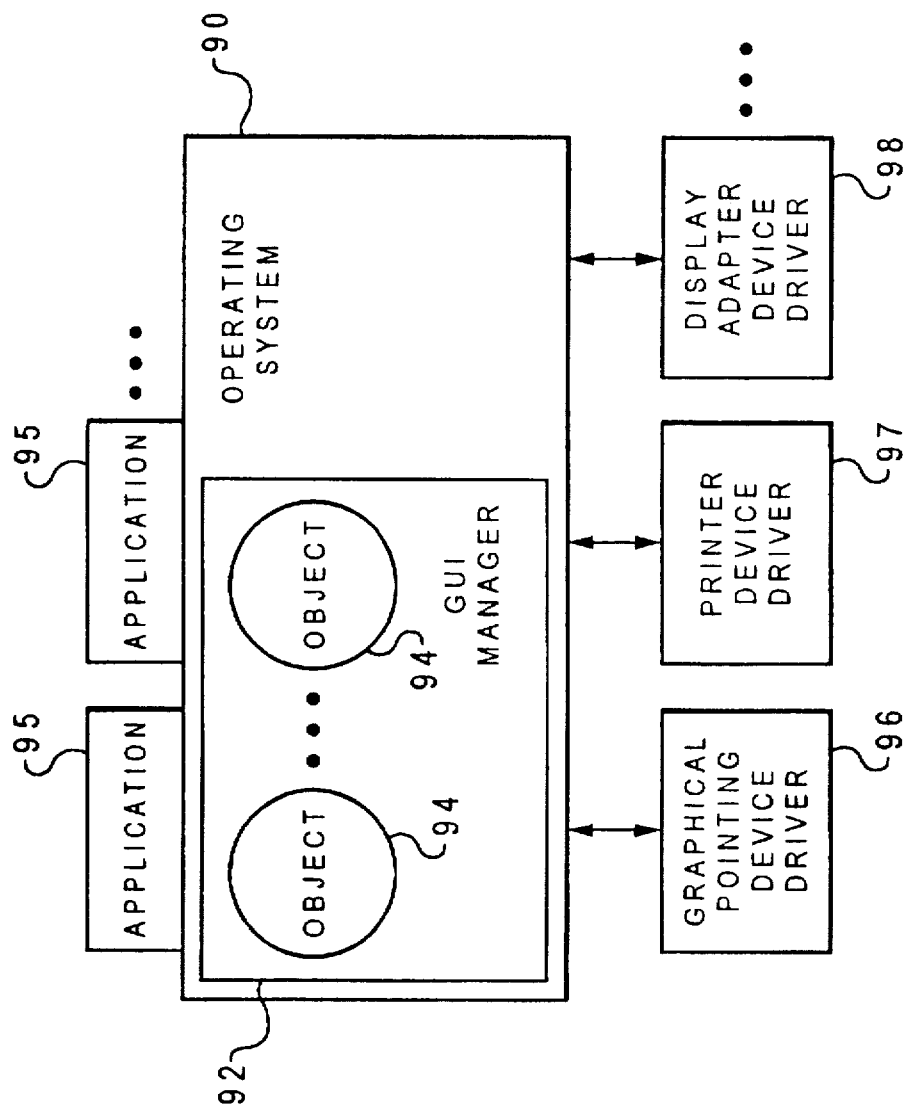
FIG. 3 illustrates a block diagram representation of a graphical user interface (GUI) manager and other software stored within the memory of the data processing system depicted in FIG. 1.

With reference now to FIG. 3, there is illustrated a pictorial representation of the software configuration of data processing system 10 in accordance with the present invention. As noted above, the software executed by data processing system 10 can be stored within one or more of volatile RAM 58, the nonvolatile storage provided by diskette drive 22, hard disk drive 23, and CD-ROM drive 24, or a remote server accessible via modem 87 or network adapter 85. As illustrated, the software configuration of data processing system 10 includes an operating system (OS) 90, which is responsible for managing the allocation and usage of the resources of data processing system 10, for example, by assigning CPU time to various execution threads and allocating portions of RAM 58 for use by various user applications 95. In accordance with the present invention, OS 90 includes a graphical user interface (GUI) manager 92 that manages the GUI with which a user of data processing system 10 interacts. Although GUI manager 92 can be structured in a variety of ways, GUI manager 92 preferably comprises a software object with which one or more software objects 94 are registered. Software objects 94, which each manage an associated graphical object displayed within display screen 100 through one or more methods, include both operating system and application software objects. Thus, although software objects 94 may include methods and data that are not necessarily a part of OS 90, all software objects 94 having methods which influence the presentation of graphical objects within display screen 100 are a component of GUI manager 92 for the purpose of the present application and are illustrated as such in FIG. 3 for the sake of simplicity.

OS 90 communicates with applications 95 through messages (called events upon receipt) conforming to the syntax of the application programming interface (API) supported by OS 90. OS 90 further communicates with graphical pointing device driver 96 and display adapter device driver 98. For example, OS 90 sends graphics data that specify display parameters and content to display adapter device driver 98, which in turn translates the messages into bus signals utilized to control display adapter 70. In addition, graphical pointing device driver 96 translates signals received from mouse 18 through keyboard/mouse controller 84 into cartesian coordinates and a selection status, which are then relayed to GUI manager 92. GUI manager 92 in turn sends messages containing the cartesian coordinates and selection status to registered software objects 94.

Figure 4A:
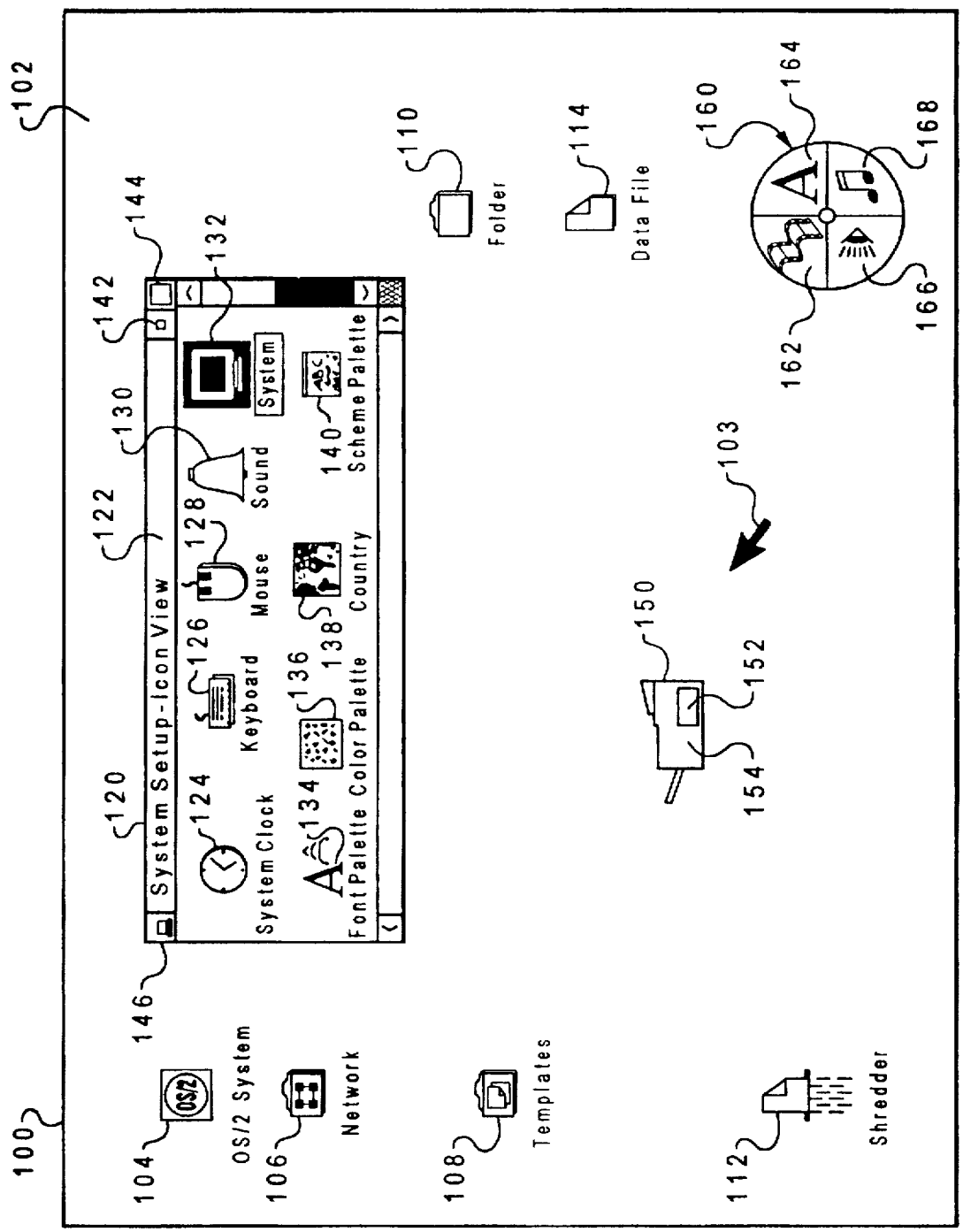
FIGS. 4A–4C depict a graphical user interface (GUI) display in accordance with the present invention that permits a user to invoke a function of a multifunction icon utilizing a drag-and-drop technique.
Figure 4B:
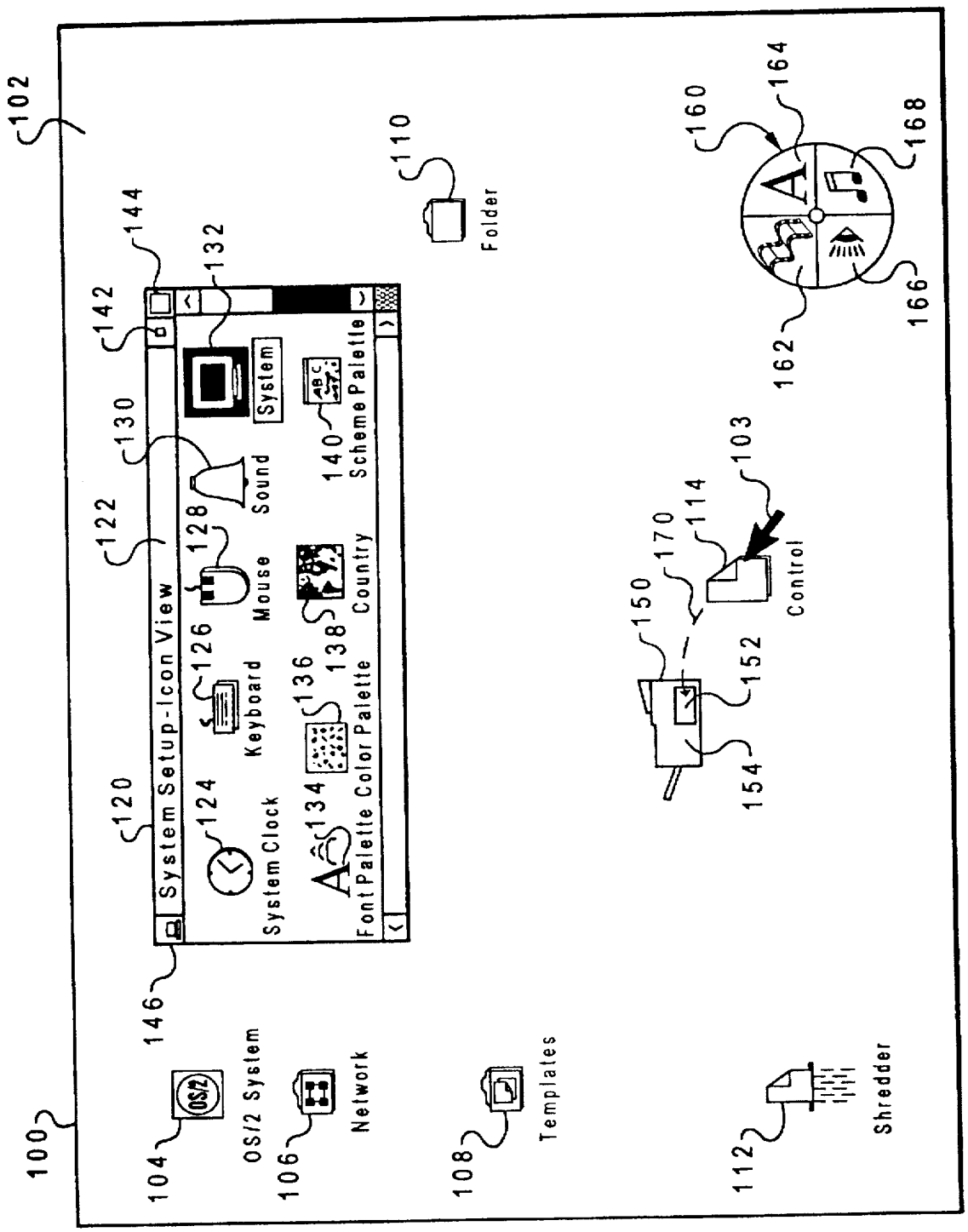
Figure 4C:
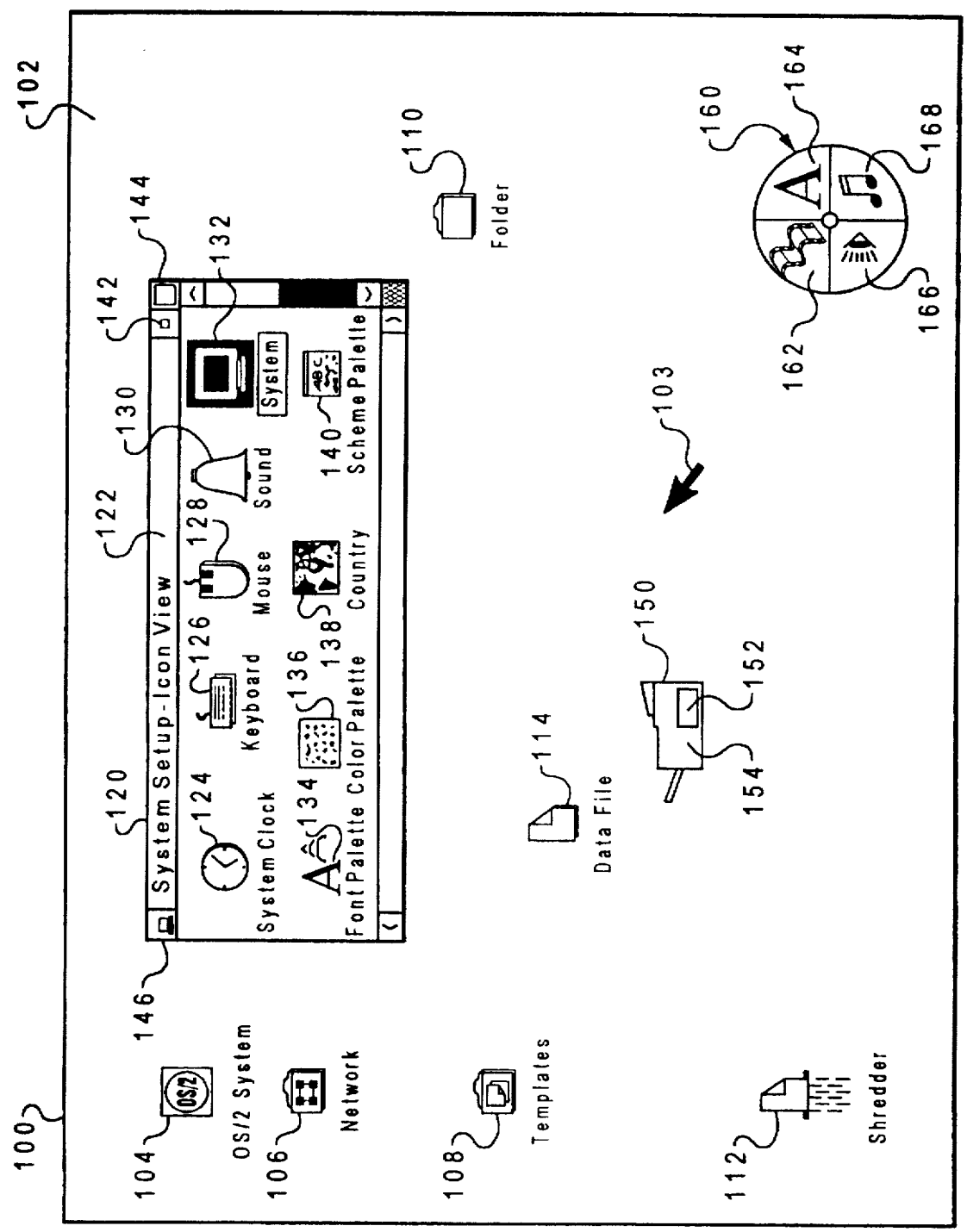

Referring now to FIGS. 4A–4C, a graphical user interface (GUI) display in accordance with the present invention is depicted, which permits a user to invoke a function of a multifunction icon utilizing a drag-and-drop technique. As illustrated, within display screen 100 a plurality of user-selectable icons 104–114, 150, and 160 are displayed on a background desktop 102. Each of icons 104–114, 150, and 160 represents an application, function(s) or file storage area, which a user can conveniently select utilizing graphical pointer 103 by manipulating mouse 18. When a user selects one of conventional icons 104–114, the function corresponding to the selected icon is activated and the selected icon is highlighted. Many of conventional icons 104–114 have an associated window or series of windows that are displayed when the icon is selected. For example, when OS/2 System icon 104 is selected, system setup window 120 is displayed to the user to provide further possible selections (i.e., icons 124–140).

In contrast to conventional icons 104–114, which each represent only a single application, function, or file area, printer icon 150 and presentation icon 160 are each comprised of multiple independently selectable regions that each represent a function. For example, printer icon 150 includes a control region 152, which is selected by a user to control the operation of printer 20, and a print region 154, which is selected by the user to print the contents of a selected file, such as data file 114. Similarly, presentation icon 160 is comprised of multimedia presentation region 162, text presentation region 164, graphics presentation region 166, and audio presentation region 168, which each provide a corresponding presentation of a selected data set upon selection.

With reference now to FIG. 4B, there is illustrated a graphical depiction of the drag-and-drop technique by which a user may invoke one of the multiple functions supported by printer icon 150. As illustrated, the user first selects data file icon 114, which represents a file containing data that the user desires either to print or to use to control the operation of printer 20. As is typical for GUIs, data file icon 114 is selected by positioning graphical pointer 103 over data file icon 114 and depressing the left button of mouse 18. The successful selection of data file icon 114 is indicated to the user by highlighting. The user then drags data file icon 114 from the initial position depicted in FIG. 4A by maintaining the left mouse button in a depressed position and moving mouse 18. Although FIG. 4B illustrates the display of graphical pointer 103 during a drag operation, in an alternative embodiment of the present invention, graphical pointer 103 is not displayed during drag operations and the position of the cursor is indicated to the user by the position the dragged graphical object.

When data file icon 114 is moved into a predefined bounding rectangle surrounding printer icon 150 (which can be coextensive with the perimeter of printer icon 150), a drag pointer indicating the region of printer icon 150 that will be selected in response to the deselection of data file 114 is displayed. In addition, the function performed by the indicated region is specified by text displayed beneath data file icon 114. Thus, in response to data file icon 114 being selected and dragged into the bounding rectangle of printer icon 150 as illustrated in FIG. 4B, the user is given a graphical indication that control region 152 will be selected in response to deselection of data file icon 114 and that the selection of control region 152 will result in data processing system 10 utilizing the data within the file corresponding to data file icon 114 to control printer 20. The user can then invoke the control function of printer icon 150 by simply releasing the left mouse button. Alternatively, the user can reposition data file icon 114 such that print region 154 is indicated by drag pointer 170 and deselect data file icon 114 such that the data file represented by data file icon 114 is printed by printer 20. In either event, data file 114 is displayed adjacent to printer icon 150 following the invocation of the selected function, as depicted in FIG. 4C.

Figure 5:
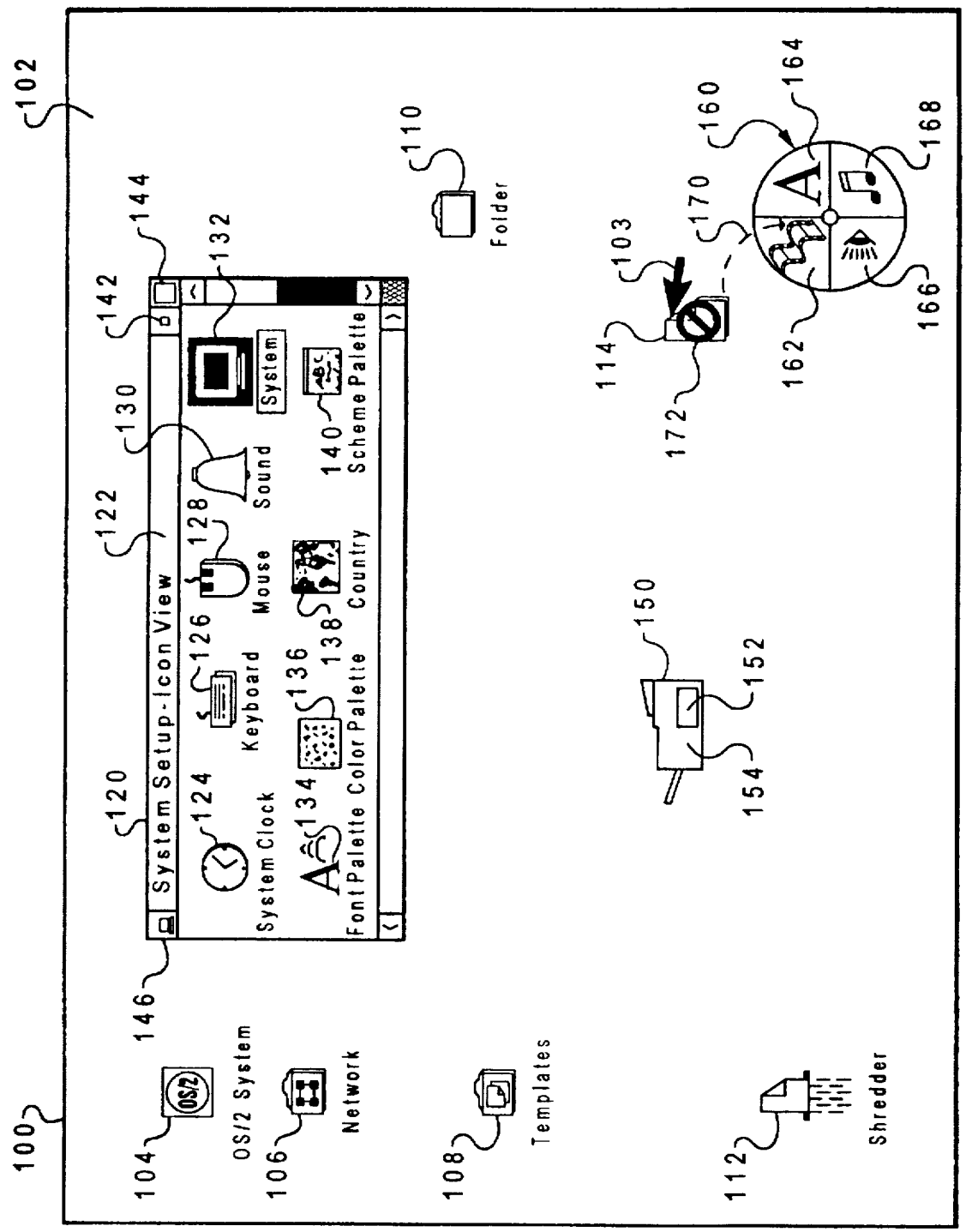
FIG. 5 illustrates a graphical user interface (GUI) display that includes an indication that a particular function of a multifunction icon is not available for selection.

As will be appreciated by those skilled in the art, not all functions supported by multifunction icons 150 and 160 can be performed on every data file. Therefore, a GUI display in accordance with the present invention graphically indicates to a user that a function associated with a particular region of a multifunction icon cannot be performed on a selected data file. As illustrated in FIG. 5, in response to the user dragging data file icon 114 into the bounding rectangle of presentation icon 160 in proximity to multimedia presentation region 162, NOT symbol 172 is displayed over data file icon 114 to indicate that the data file represented by data file icon 114 cannot be presented in multimedia format.

Figure 6:
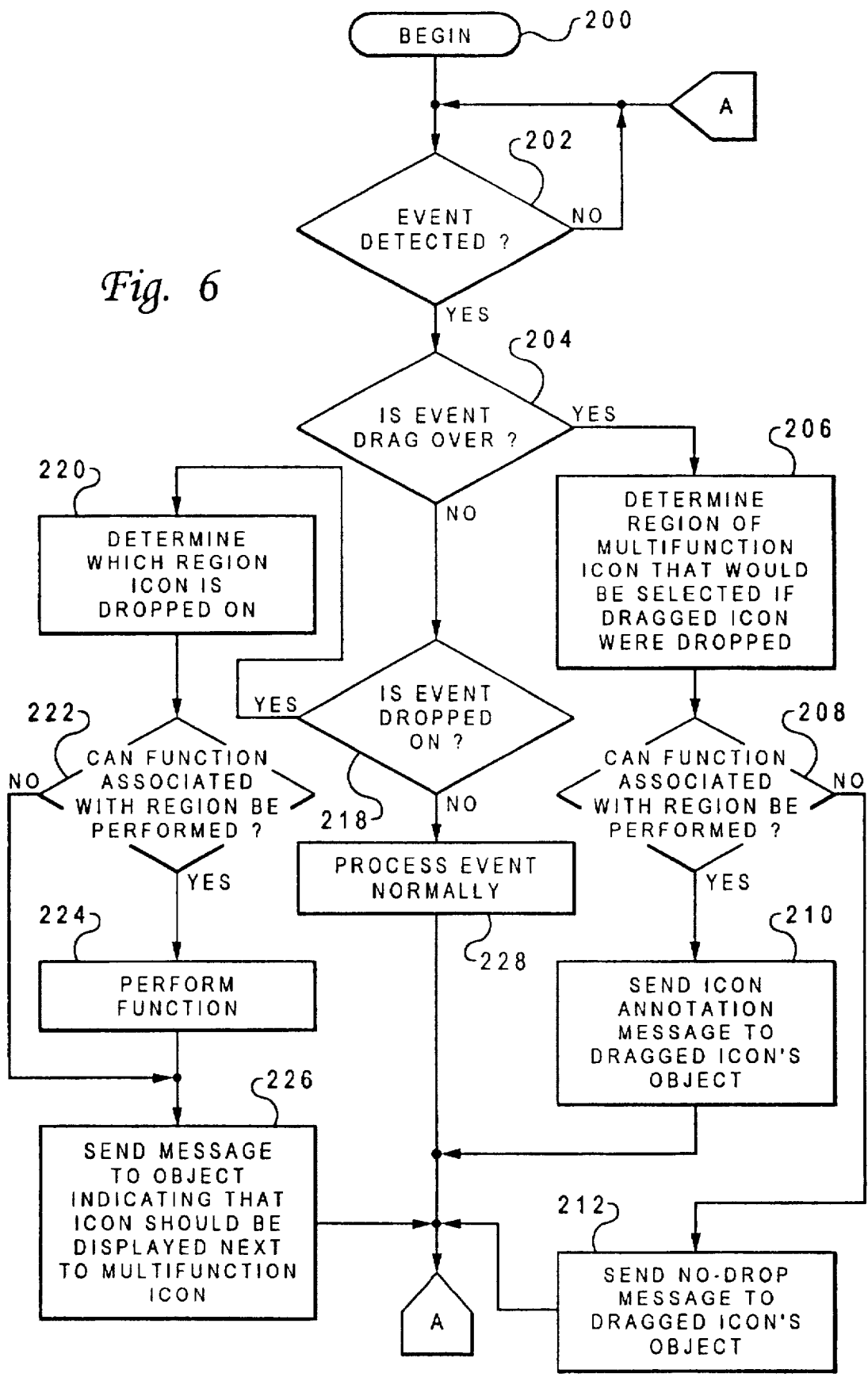
FIG. 6 is a logical flowchart depicting a process executed by a software object associated with a multifunction icon in accordance with the present invention.

Referring now to FIG. 6, there is depicted a logical flowchart of a process performed in response to receipt of an event by a software object within GUI manager 92 associated with a multifunction icon. As depicted, the process begins at block 200 and thereafter proceeds to block 202, which illustrates a determination of whether or not an event has been received. If not, the process iterates at block 202 until such time as an event is received by the software object. In response to receipt of an event by the software object, the process proceeds from block 202 to block 204, which depicts a determination of whether or not the received event indicates that an icon has been dragged within the bounding rectangle of the multifunction icon associated with the software object. If so, the process then proceeds to block 206, which illustrates a determination of the region of the multifunction icon that would be selected if the dragged icon were dropped at its present location. The determination illustrated at block 206 can be made, for example, by determining from cartesian coordinates within the event which region is closest to the present location of the dropped icon. Next, the process proceeds to block 208, which depicts a determination of whether or not the function associated with the region identified at block 206 can be performed. This determination is made, for example, by determining whether the data file represented by the dragged icon contains the appropriate data type for the indicated function. In response to a determination that the function associated with the identified region can be performed, the software object sends an annotation message to the software object associated with the dragged icon that includes a textual identification of the function, as illustrated at block 210. However, in response to a determination that the function cannot be performed, the process proceeds from block 208 to block 212, which depicts the software object associated with the multifunction icon sending a no-drop message to the software object associated with the dragged icon. The process then returns from either of blocks 210 or 212 to block 202 through page connector A.

Returning to block 204, if a determination is made that the received event does not indicate that an icon was dragged into the bounding rectangle of the multifunction icon, the process proceeds to block 218. Block 218 illustrates a determination of whether or not the event detected at block 202 indicates that a dragged icon was dropped within the bounding rectangle of the multifunction icon. If not, the process proceeds to block 228, which illustrates processing the event normally. The process then returns to block 202 through page connector A in the manner which has been described.

However, if a determination is made at block 218 that the event indicates that a dragged icon was dropped within the bounding rectangle of the multifunction icon, the process passes to block 220, which depicts a determination of the region of the multifunction icon on which the dragged icon was dropped, for example, by comparing the cartesian coordinates specified within the event to the boundaries of the regions of the multifunction icon. The process then proceeds to block 222, which illustrates a determination of whether or not the function associated with the selected region can be performed. If not, the process passes to block 226, which is described below. However, if a determination is made that the function associated with the selected region can be performed, the process proceeds from block 222 to block 224, which depicts data processing system 10 performing the function associated with the selected region of the multifunction icon. Next, the process proceeds to block 226, which illustrates the software object associated with the multifunction icon sending a message to the software object associated with the dragged icon indicating that the dragged icon should be displayed on the desktop adjacent to the multifunction icon. Thereafter, the process returns to block 202 in the manner which has been described.

Figure 7:
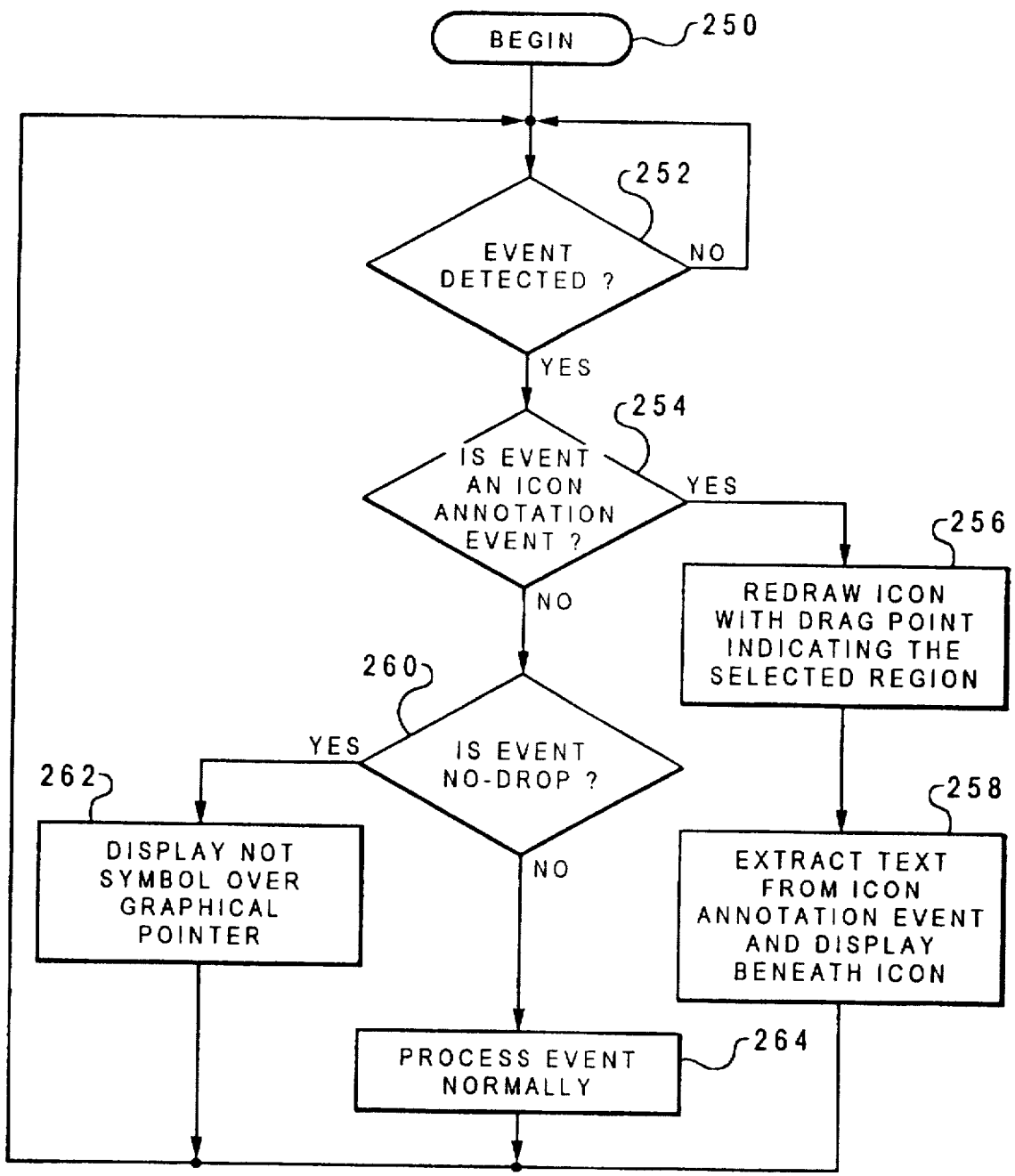
FIG. 7 is a logical flowchart illustrating a process executed by a software object associated with a dragged icon in accordance with the present invention.

With reference now to FIG. 7, there is illustrated a logical flowchart of a process performed by a software object within GUI manager 92 associated with a dragged icon. As depicted, the process begins at block 250 and thereafter proceeds to block 252, which depicts a determination of whether or not an event has been received. If not, the process iterates at block 252 until such time as an event is received. In response to a determination that an event has been received, the process proceeds from block 252 to block 254, which illustrates a determination of whether or not the received event is an icon annotation event. If so, the process then proceeds to block 256, which depicts the software object associated with the dragged icon causing the dragged icon to be redrawn with a drag pointer 170 extending from the dragged icon to the region of the multifunction icon identified at block 206 of FIG. 6. The process proceeds from block 256 to block 258, which illustrates the software object associated with the dragged icon extracting the annotation text from the annotation event and causing the annotation text to be displayed beneath the dragged icon to indicate the function associated with the identified region of the multifunction icon. Thereafter, the process returns to block 252.

Referring again to block 254, in response to a determination that the received event is not an icon annotation event, the process proceeds to block 260, which illustrates a determination of whether or not the event is a no-drop event, that is, an event indicating that the function associated with the identified region of the multifunction icon cannot be performed. If not, the process passes to block 264, which depicts the software object associated with the dragged icon processing the event normally. However, if a determination is made at block 260 that the received event is a no-drop event, the process proceeds to block 262, which illustrates the software object associated with the dragged icon causing NOT symbol 172 to be displayed over the dragged icon. The process thereafter returns to block 252 from either of blocks 262 or 264.

As has been described, the present invention provides an improved method and system for invoking a function within a data processing system, which permit a user to select a function supported by a multifunction icon utilizing a drag-and-drop technique. The present invention enhances the facility with which a function of a multifunction icon may be selected by providing the user with a graphical and intuitive indication of the available functions prior to selection and by obviating the need to provide additional pop-up menus or other selection mechanisms.

While the invention has been particularly shown and described with reference to a preferred embodiment, it will be understood by those skilled in the art that various changes in form and detail may be made therein without departing from the spirit and scope of the invention.

What is claimed is:

1. A method of invoking a function within a data processing system, said method comprising:

displaying a first graphical object and a second graphical object within a display device of a data processing system, wherein said second graphical object includes a plurality of regions that each have an associated function;

in response to a selection of said first graphical object, determining if said first graphical object is within a selected proximity of said second graphical object;

in response to said determination, graphically indicating a particular region among said plurality of regions of said second graphical object that would be selected in response to a deselection of said first graphical object by displaying a graphical element extending from said first graphical object to said particular region of said second graphical obiect; and in response to a deselection of said first graphical object while said particular region is indicated, performing said function associated with said particular region.

2. The method of invoking an action within a data processing system of claim 1, and further comprising the steps of:

displaying a graphical pointer within said display device; and selecting said first graphical object utilizing said graphical pointing device.

3. The method of invoking an action within a data processing system of claim 2, wherein said step of displaying said first graphical object comprises the step of displaying said first graphical object at a location within said display device determined by said graphical pointer.

4. The method of invoking an action within a data processing system of claim 1, wherein said particular region is selected in response to a relative position of said first and said second graphical objects.

5. The method of invoking an action within a data processing system of claim 1, and further comprising the step of indicating an action associated with said particular region.

6. The method of invoking an action within a data processing system of claim 1, wherein said first graphical object represents a data set and wherein said step of performing said action associated with said particular region comprises performing said action associated with said particular region on said data set represented by said first graphical object.

7. The method of invoking an action within a data processing system of claim 1, and further comprising the steps of:

determining whether an action associated with said particular region that would be selected in response to a deselection of said first graphical region can be performed; and in response to a determination that said action associated with said particular region cannot be performed, displaying a graphical indication that said action cannot be performed.

8. A data processing system, comprising:

a processing unit;

a display device coupled to said processing unit, wherein said display device displays a first graphical object and a second graphical object in response to receipt of signals from said processing unit, said second graphical object including a plurality of regions;

a memory coupled to said processing unit; and a plurality of routines stored within said memory, wherein each of said plurality of routines is associated with one of said plurality of regions within said second graphical object;

a graphical user interface (GUI) manager stored within said memory and executable by said processing unit, wherein in response to a selection of said first graphical object and said first graphical object being located within a selected proximity of said second graphical object, said GUI manager causes a graphical indication of a particular region among said plurality of regions that would be selected in response to a deselection of said first graphical object to be displayed within said display device, said graphical indication including a graphical element extending from said first graphical object to said particular region of said second graphical object, and wherein in response to a deselection of said first graphical object while said particular region is indicated, said GUI manager invokes a routine among said plurality of routines that is associated with said particular region.

9. The data processing system of claim 8, said data processing system further comprising:

a graphical pointing device, said graphical pointing device having a switch associated therewith;

wherein said GUI manager manages display within said display device of said first and second graphical objects and a graphical pointer controlled by said graphical pointing device, and wherein said GUI manager determines that said first graphical object is selected in response to closure of said switch while said graphical pointer is positioned over said first graphical object.

10. The data processing system of claim 9, wherein said GUI manager causes said first graphical object to be displayed at a location within said display device determined by a position of said graphical pointer in response to a selection of said first graphical object.

11. The data processing system of claim 8, wherein said particular region is selected in response to a relative position of said first and said second graphical objects.

12. The data processing system of claim 8, wherein said GUI manager causes an indication of a routine associated with said particular region to be displayed in conjunction with said graphical indication of said particular region.

13. The data processing system of claim 8, and further comprising a data set stored within said memory, wherein said data set is represented by said first graphical object displayed within said display device, and wherein said routine invoked by said GUI manager operates on said data set represented by said first graphical object.

14. The data processing system of claim 8, wherein said GUI manager determines whether a routine associated with said particular region that will be selected in response to a deselection of said first graphical region can be executed, and in response to a determination that said routine associated with said particular region cannot be executed, causes a graphical indication that said routine cannot be executed to be displayed within said display device.

15. An electronic readable medium encoded with a graphical user interface (GUI) manager that includes a plurality of routines that are each associated with one of a plurality of regions within a second graphical object, wherein in response to a selection of a first graphical object and said first graphical object being located within a selected proximity of said second graphical object, said GUI manager causing a graphical indication of a particular region among said plurality of regions that would be a selected in response to a deselection of said first graphical object to be displayed within a display device, said graphical indication including a graphical element extending from said first graphical object to said particular region of said second graphical object, and wherein said GUI manager invokes a routine associated with said particular region in response to a deselection of said first graphical object while said particular region is indicated.

16. The electronic readable medium of claim 15, wherein said GUI manager manages display of said first and second graphical objects and a graphical pointer, and wherein said GUI manager determines that said first graphical object is selected in response to receipt of a selected input while said graphical pointer is positioned over said first graphical object.

17. The electronic readable medium of claim 16, wherein said GUI manager causes said first graphical object to be displayed at a location within said display device determined by a position of said graphical pointer in response to a selection of first graphical object.

18. The electronic readable medium of claim 15, wherein said particular region is selected in response to a relative position of said first and said second graphical objects.

19. The electronic readable medium of claim 15, wherein said GUI manager causes an indication of a routine associated with said particular region to be displayed in conjunction with said graphical indication of said particular region.

20. The electronic readable medium of claim 15, wherein said first graphical object is representative of a data set, and wherein said method invoked by said GUI manager operates on said data set.

21. The electronic readable medium of claim 15, wherein said GUI manager determines whether a routine associated with said particular region that will be selected in response to a deselection of said first graphical region can be performed, and in response to a determination that said routine associated with said particular region cannot be performed, causes a graphical indication that said routine cannot be performed to be displayed.

* * * * *